US008319508B2

(12) United States Patent
Vokey

(10) Patent No.: US 8,319,508 B2
(45) Date of Patent: *Nov. 27, 2012

(54) METHOD AND APPARATUS TO DETECT AND LOCATE ROOF LEAKS

(75) Inventor: David E. Vokey, Sidney (CA)

(73) Assignee: Detec Systems LLC, Sidney, British Columbia (CA)

( * ) Notice: Subject to any disclaimer, the term of this patent is extended or adjusted under 35 U.S.C. 154(b) by 259 days.

This patent is subject to a terminal disclaimer.

(21) Appl. No.: 12/646,265

(22) Filed: Dec. 23, 2009

(65) Prior Publication Data

US 2010/0141283 A1 Jun. 10, 2010

Related U.S. Application Data

(63) Continuation-in-part of application No. PCT/CA2008/001457, filed on Aug. 13, 2008.

(51) Int. Cl.
*G01R 27/08* (2006.01)
*G01R 31/08* (2006.01)
*G08B 21/00* (2006.01)

(52) U.S. Cl. ......... 324/718; 324/693; 324/522; 340/605

(58) Field of Classification Search .................. 324/216, 324/237–238, 240, 456, 500, 512, 522–523, 324/557, 600, 649, 691, 713, 715, 718; 340/539.22, 340/605
See application file for complete search history.

(56) References Cited

U.S. PATENT DOCUMENTS

| | | | | | |
|---|---|---|---|---|---|
| 4,021,981 | A | * | 5/1977 | Van Wagoner | 52/309.13 |
| 4,965,554 | A | * | 10/1990 | Darling | 340/604 |
| 5,081,422 | A | * | 1/1992 | Shih | 324/693 |
| 5,540,085 | A | * | 7/1996 | Sakata et al. | 73/49.2 |
| 5,640,096 | A | * | 6/1997 | Alm | 324/559 |
| 7,295,003 | B2 | * | 11/2007 | Uyehara et al. | 324/219 |
| 7,554,345 | B2 | * | 6/2009 | Vokey | 324/718 |
| 7,602,196 | B2 | * | 10/2009 | Vokey | 324/718 |
| 7,652,481 | B2 | * | 1/2010 | Vokey | 324/523 |
| 7,768,412 | B2 | * | 8/2010 | Vokey | 340/604 |
| 7,847,560 | B2 | * | 12/2010 | Vokey | 324/523 |
| 7,872,479 | B2 | * | 1/2011 | Lorenz et al. | 324/691 |
| 7,898,246 | B2 | * | 3/2011 | Georgeson et al. | 324/229 |
| 2011/0178747 | A1 | * | 7/2011 | Gunness | 702/65 |

* cited by examiner

*Primary Examiner* — Joshua Benitez
(74) *Attorney, Agent, or Firm* — Adrian D. Battison; Ade & Company Inc.

(57) ABSTRACT

A leak in a membrane on top of a horizontal roof deck is located by applying conductive wires on the membrane underneath the aggregate in a grid pattern. A measuring and switching circuit generates voltage having a positive attached to the roof deck and a negative attached to the wires. The circuit has a relay for each wire which can be switched between a current sensor system and the negative potential. The sensor system is arranged to sense at each of the wires in turn the current flowing from the roof deck through any leak in the membrane to the wire. A micro-processor operates the relays in turn to connect all the other wires to the negative as a shield while each wire is sensed. From the output of the grid the changes in current in the x and y directions are analyzed to locate the leak in the membrane.

11 Claims, 13 Drawing Sheets

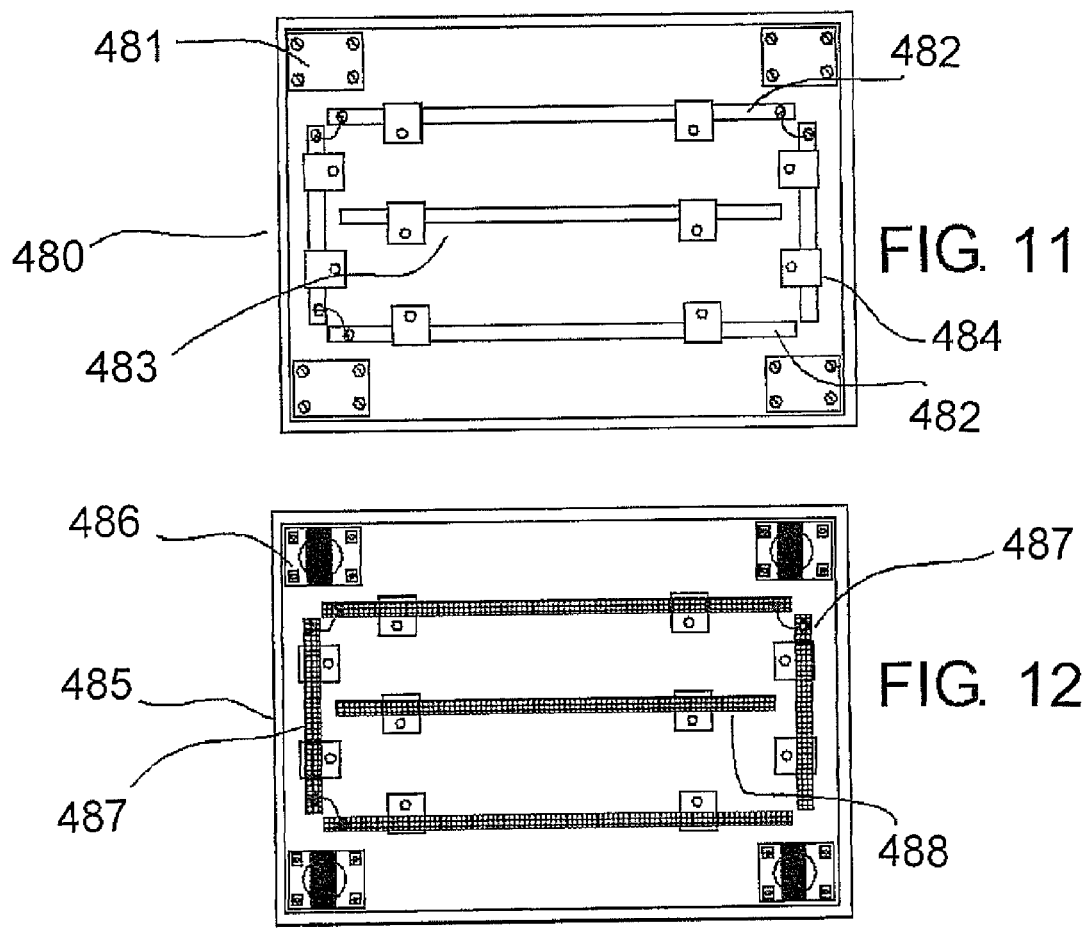

FRONT VIEW

METHOD AND APPARATUS TO DETECT AND LOCATE ROOF LEAKS

This application is a continuation-in-part application from PCT Application No. PCT/CA2008/001457 filed Aug. 13, 2008.

The present invention relates to a system for monitoring roof membranes for the presence and location of moisture penetration. It has particular application to monitoring low-slope and flat roofs of residential and commercial buildings for undesired water ingress.

BACKGROUND OF THE INVENTION

The failure to detect, find and correct minor roof deterioration in the earliest stages is considered the greatest cause of premature roof failure. This is particularly true of roofing materials applied on low-slope or flat roofs. Costly roofing problems are often the result of design deficiencies or faulty application of the roof system. Even when properly designed and applied, all roofing materials deteriorate from exposure to the weather at rates determined largely by the kind of material and the conditions of exposure.

Several methods have been used to try and locate roof leaks after they have occurred. Electric capacitance meters identify leaks uses a low-frequency that measures dielectric constant changes in the roofing material as a result of moisture below the membrane. Infrared cameras allow technicians to scan roof surfaces for temperature differentials that signify moist areas through changes in thermal conductivity or evaporation. Electric field vector mapping uses a wire loop around the perimeter of the roof surface to introduce an electric potential between the structural deck and a selected roof area which is sprayed with water. The electric field potential caused by a conductive path to any roof membrane damage is then located using a sensitive voltmeter and a pair of probes.

All of the above methods are usually employed to assist in locating roof leaks after costly water damage has occurred.

U.S. Pat. No. 4,565,965 issued Jan. 21, 1986 to Geesen discloses an arrangement for detecting leaks in flat roofs covered with a gravel layer in which electrical pulses are transmitted through the moisture in the leak to the roof edge and then the roof is scanned by a pulse sensor to find the leak by locating the maximum amplitude.

Moisture detection sensors can also be placed under the roof membrane to detect the presence of moisture intrusion. However several roof designs incorporate membranes that are directly adhered to the roof deck thereby limiting the placement and effectiveness of this type of moisture sensor application.

In regard to pitched roofs which are of a different construction and hence provide different challenges and requirements, U.S. Pat. No. 5,081,422 issued Jan. 14, 1992 to Shih discloses an arrangement for detecting leaks in pitched roofs using parallel pairs of conductors to detect a change in resistance value therebetween caused by the presence of moisture where the pairs are arranged in an array of the pairs spaced in the x and y directions. Testing of each pair sequentially will locate the leak in the x and y direction. The pairs are typically located on the supporting plywood beneath the tar paper and shingles but can be located on top of the tar paper and underneath the shingles or tar/sand mixture. In all cases the conductors are provided in pairs at the same location in the roof construction.

In some cases the leakage current from roof drains, un-insulated metal flashings and other roof fixtures can result in higher than normal current leakage to grounding points on the roof membrane. While a guard circuit applied to adjacent grid conductors drains off most of the stray current, a small percentage of the current can leak past and reach the measuring conductor. This stray leakage current can be on the order of several milliamps and result in fault locating ambiguity in the area being tested.

SUMMARY OF THE INVENTION

It is an object of the present invention to provide a method which includes a guard enhancement circuit which reduces the stray leakage current thereby reducing measurement ambiguity and increasing the fault locating sensitivity in the area being tested.

According to the invention therefore there is provided a method of locating a defect in a water impermeable membrane of a roof, where the roof comprises a generally horizontal roof support deck with the water impermeable membrane applied onto an upper surface of the support deck, the method comprising:

locating a conductive detector on an upper surface of the roof membrane;

defining a shielding zone on the upper surface of the membrane by providing at least one shielding conductor on the upper surface and by generating an electrical potential difference between said at least one shielding conductor and the roof deck such that currents generated outside the zone are drawn to said at least one shielding conductor;

generating an electrical potential difference between the conductive detector and the roof deck such that, in the presence of a defect located within the zone, current flows between the roof deck and the conductive detector through moisture at the defect;

sensing the current between the roof deck and the conductive detector so as to detect any defect located within the zone;

and arranging the electrical potential difference between said at least one shielding conductor and the roof deck so as to be greater than the electrical potential difference between the conductive detector and the roof deck.

Preferably said at least one shielding conductor and the conductive detector are bare wires applied to the upper surface of the membrane. However other constructions such as tapes with an exposed conductor on the tape can be used.

The one shielding conductor and the conductive detector may be covered by an aggregate or covering material over the membrane.

Preferably said at least one shielding conductor and the conductive detector include insulating sleeves thereon to allow another one of the conductive detectors to pass over the sleeve at right angles thereto.

Preferably there is provided a plurality of conductive detectors on the upper surface of the roof membrane which are arranged in a grid pattern providing indications of distance in x and y direction across the membrane with each conductive detector being electrically insulated from each other; wherein each one of the conductive elements is selected in turn and wherein the sensed currents are analyzed in the x and y directions to locate the defect in the membrane. However other arrangements of the conductive detector and the shielding conductors can be used.

Preferably, when each one of the conductive elements is selected in turn, at least some of the other conductive elements are connected so as to form shielding conductors.

Preferably the shielding conductor is arranged to receive current generated by un-insulated roof fixtures.

The same sensors can also be used for a cathodic protection system in which a secondary cathodic protection supply and switch is provided such that in the off state, when no measurements are being made, a low voltage (usually about −0.85 to −1.1 vdc), cathodic protection supply is applied between all the sensor conductors and the building ground connected to the rood deck to inhibit corrosion and electrolysis.

The present invention thus describes a method whereby a grid of sensor conductors are laid on top of a directly adhered roof membrane to effect continuous scanning of the membrane for damage and moisture intrusion while avoiding false readings from metallic fasteners and other roof conductive penetrations that could cause false readings.

If needed, a permanent shield wire can be place around conductive roof penetrations to provide further isolation and avoid false readings.

The present invention thus proposes a system whereby conductive detectors can be laid on the top surface of a roof membrane in a grid like pattern whereby the conductor sensors are insulated from each other at the intersections. The individual conductors are electrically connected at a one end to a switching and measuring circuit whereby isolated fault current to ground measurements can be made. In the present invention a selected conductor is switched to the input of a current sensing amplifier and an electric potential is applied between the selected conductor and the roof deck ground. Any moisture leakage path through the roof membrane in the immediate region of the selected conductor will result in a fault current that is detected by the measuring circuit. All other detection conductors are connected to the circuit ground which forms an electric shield between the selected conductor and any other membrane damage locations beyond the conductors immediately adjacent to the selected conductor.

The fault current level for the gridded area as a function of the grid location can be mapped out by sequencing the selection and measurement process through all of the individual conductors.

Steel, concrete and even wood (if damp enough) are suitable conductors under the insulating water-proof membrane to provide the roof deck ground for this method to work.

The voltage applied is preferably a DC voltage but an AC signal could also work. There are several ways to implement an AC detection circuit and one could overcome any potential DC offsets from half-cell potentials. However DC works well and is easier. The above patent of Geesen proposes an arrangement by which an AC signal can be used and a person skilled in the art can adapt such an arrangement to the present construction.

Typically, the test described and claimed herein is carried out on a membrane before any overburden such as gravel or pavers are placed on top. In this case all the seams near the wall/roof deck interface and on the vertical portions of the parapet are tested using the technique. After this test the carriage arrangement described herein is used to test the main area of the horizontal roof membrane.

The further technique of the framed probes described herein is used when the deck is covered with an overburden or garden and the membrane is covered.

Preferably the receiver includes a variable sensitivity and an analog display for the differences in current detected.

Preferably the receiver provides an audible signal emitter such that a signal indicating the maximum leakage current detected can be determined audibly.

Preferably the audible signal emitter includes a voltage to frequency converter.

If required there may be provided an external connection to the receiver common ground to form an external grounding or screening connection to allow electrical isolation of the area under test.

Thus un-insulated wire or metal foil can be placed on the membrane at the end or ends of the area to be tested;

In this way, the un-insulated wire or metal foil connected to the common ground by a connecting lead acts so as to block and ground any leakage current outside of the area under test so that the probe will only detect any leakage current in the test area.

BRIEF DESCRIPTION OF THE DRAWINGS

One embodiment of the invention will now be described in conjunction with the accompanying drawings in which:

FIGS. 11, 12 and 13 show respectively a top plan view, a bottom plan TO view and a front view of the carriage and sensing system for use in the general method of FIG. 5.

In the drawings like characters of reference indicate corresponding parts in the different figures.

DETAILED DESCRIPTION OF THE PREFERRED EMBODIMENT

Figure 1:
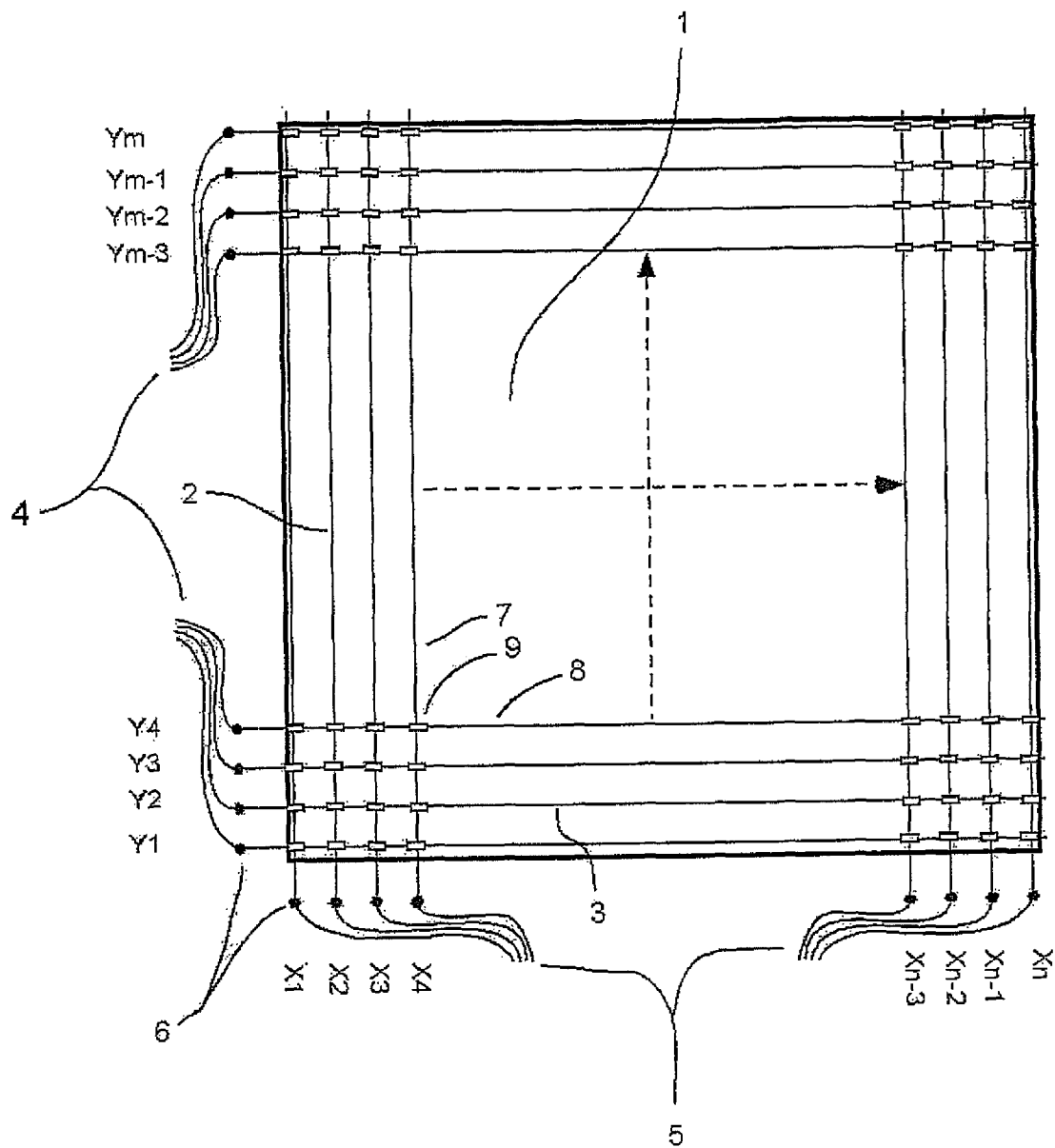
FIG. 1 is a schematic plan view of a roof membrane with the detection conductor grid, forming a part of the embodiment of the present invention, applied.
Figure 2:
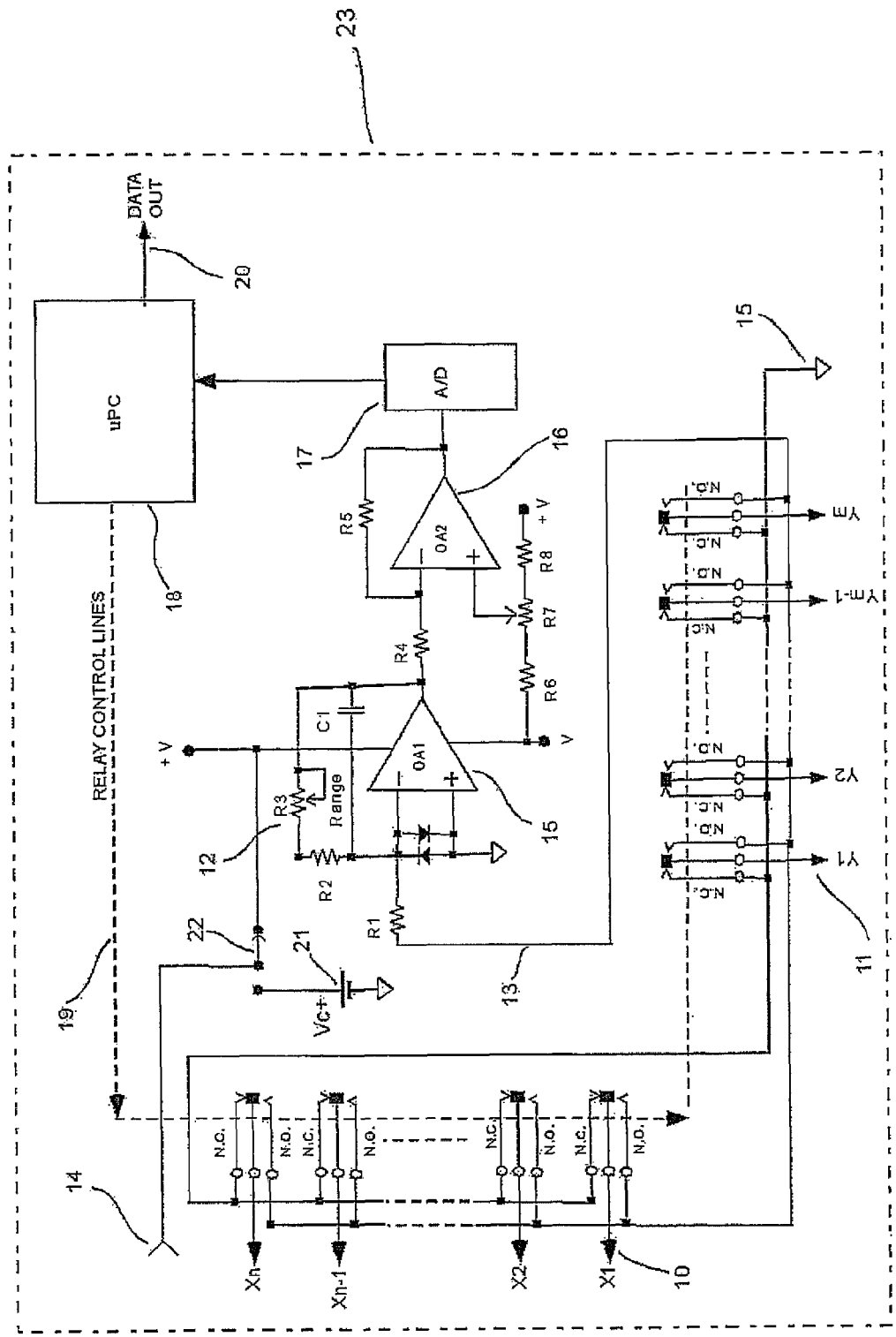
FIG. 2 is a circuit schematic showing the measuring and control circuit for monitoring the conductors of FIG. 1.
Figure 3:
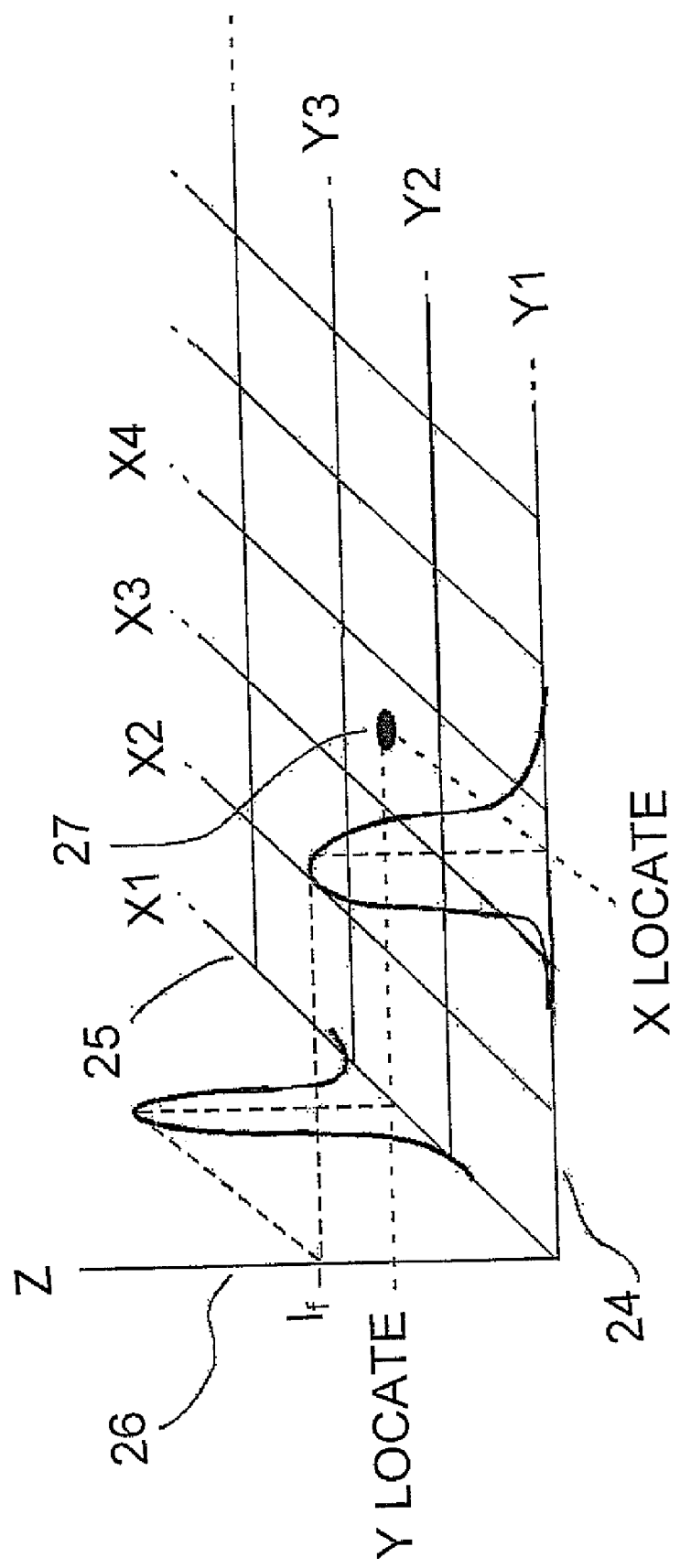
FIG. 3 is an illustration of a plotted output of a roof membrane scan using the outputs from the circuit of FIG. 2.
Figure 4:
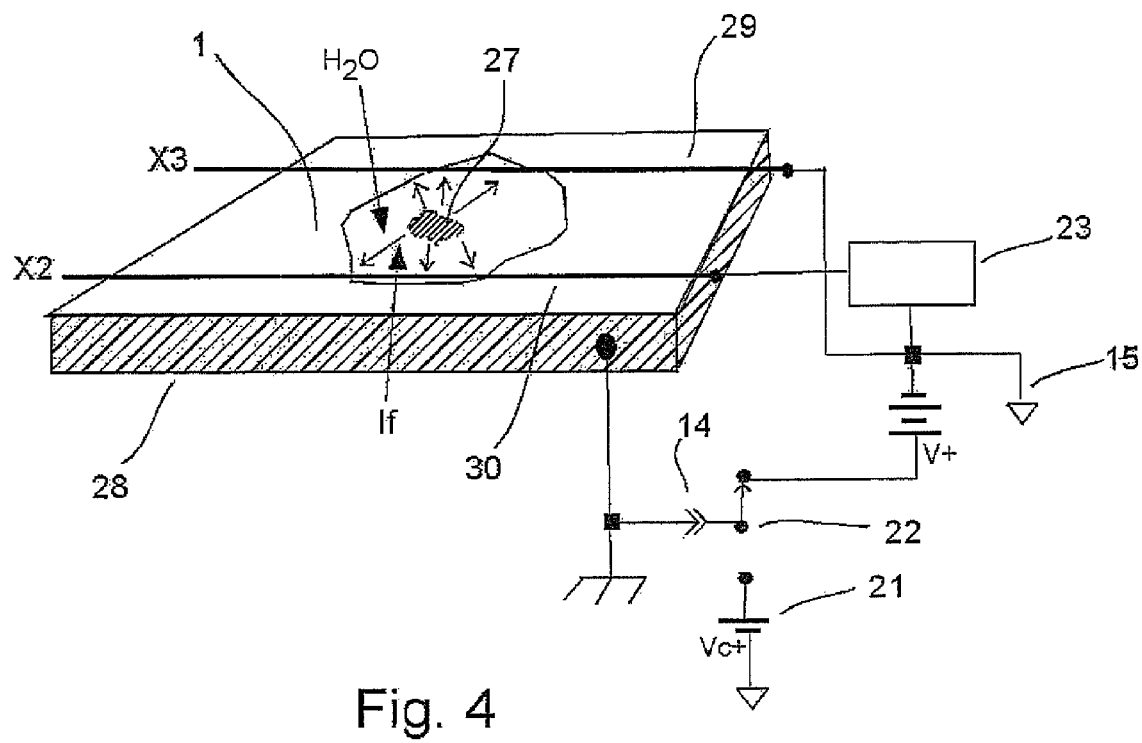
FIG. 4 is an isometric view of a typical installation of the detection conductor grid in a typical flat roof construction.

Referring now to FIGS. 1 to 5 of the drawings, the overall arrangement of the subject roof membrane moisture detection system can best be seen with reference to FIGS. 1 and 4. A roof membrane 1 is illustrated which is applied as a direct covering layer over a roof deck 1A. The deck is typically of concrete but can be of any suitable material to provide the necessary structural strength and can be steel or wood. The membrane is an impervious material such as plastics and is sealed at any joints to provide a continuous water barrier over the roof deck. This barrier is intended to provide the leak prevention and any penetration therein caused by a puncture or faulty seal or by wear can allow the moisture to penetrate to the deck where it can cause damage or can continue into the structure to cause damage to internal structures.

The membrane may be covered by a layer of an aggregate material for heat insulation and protection. If used, the aggregate may be loose or may contain a binder such as asphalt. The arrangement described herein can be used with various roof constructions they can range from directly adhered membranes with no ballast (aggregate) to fully built up roofs with gardens.

Conductive moisture sensing cables 2 and 3 which are simple bare stranded stainless steel wires are laid across the roof in an array of parallel and generally orthogonal directions. The wires are usually sealed at the distal ends to avoid shorts. The wires can be bonded to the membrane. The array can be of any suitable layout to generate areas between the individual wires which can be monitored for the leak. The parallel arrangement of wires in the x and y direction is preferred but other arrangements are possible. The conductor-to-conductor spacing in the x and y directions is selected by the desired accuracy of locate. A one to two meter spacing is typical. A series of insulated connecting cables 4 and 5 are spliced at splices 6 to the originating ends of the sensing conductors. At crossing points each of the x direction sensing conductors 7 are insulated from the y direction wires 8 by a sleeve 9 applied onto one of the wires which is formed of a plastic or other suitable non-conducting material.

In place of separate wire sensor cables which are laid out into the grid pattern, flat conductors adhered to a dielectric substrate with a peel-and-stick backing provided by a pressure sensitive adhesive covered by a release sheet can also be used to form an adhered grid pattern on top of the membrane.

In FIGS. 2 and 4 is shown the measuring and switching circuit 23 which acts to apply the electric potential across the roof deck and the wires and acts to select one of the wires for sensing. This includes a sensing, amplifying and A/D conversion system including a pair of amplifiers 15A and 16A and an A/D converter 17. The components are controlled by microprocessor 18 which activates two series of relays 10 and 11.

The individual connecting cables 4 from zones Y1 to Ym are terminated on the inputs Y1 to Ym of Y axis relays 11. The individual connecting cables from zones X1 to Xn (5) are terminated on the inputs X1 to Xn of the X axis relays 10. In the normally closed position of the relays, the sensing cables are all connected to circuit ground 15.

The roof deck 28 is connected to the positive side of the circuit power supply 18 though a connector 14.

Once a selected relay 10 or 11 is energized by the microprocessor 18, the selected line is connected on a line 13 through resistor R1 to the negative summing input of OA1 of the amplifier 15A. D1 and D2 are input protection diodes. The gain of the amplifier 15A is set by resistors R2 and R3 to match the desired fault current range which constitutes a threshold of the current flowing between the selected wire and the roof deck.

In order to automatically adjust the threshold, the resistor 12 R3 may be a variable resistance controlled by the microprocessor 18.

Capacitor C1 provides noise filtering and smoothes the output response of amplifier 15. Resistor R4 couples the output of amplifier 15A to the input of the negative summing input of amplifier 16A. Resistors R4 and R5 are selected to provide suitable range scaling for the analog to digital converter 17. Resistors R6, R7 and R8 form an adjustable voltage divider network to provide offset adjust for amplifier 16A.

The amplified and filtered current measurement signal from the selected relay is applied from the output of amplifier 16A to the input of the A/D converter 17. The digital level output from the A/D converter is then forwarded to the microprocessor controller 18 which processes and forwards the result 20 to a monitoring computer. The micro-processor controller 18 then increments the energizing signal to the next sequential relay via the relay control lines 19. The sequence is repeated until the $n^{th}$ and $m^{th}$ X and Y relays have been reached respectively.

Detection of a leak in the roof, defined by the generally horizontal roof support deck 28 with a water impermeable membrane 1 applied onto the upper surface of the support deck, is effected by applying conductive detectors 2 and 3 on the top surface of the roof membrane in the grid pattern providing indications of distance in x and y direction across the membrane. The measuring and switching circuit 23 causes the application of the electrical potential between the roof support deck on the under side of the membrane and the wires on the top and acts to sense at each of the conductive detectors in turn the current flowing from the roof support deck to the conductive detectors. The changes in current in the x and y directions are analyzed to locate the leak in the membrane.

While the current at one of the conductive detectors is sensed, the others of the conductive detectors are connected to circuit ground so as to be opposite in potential to the roof deck such that the other detection conductors form a shielded zone around the selected conductor defining an electric shield between the selected conductive detector and any other membrane damage locations beyond the conductive detectors immediately adjacent to the selected conductor. As each conductor is selected the shielded zone around that selected conductor in effect is moved across the roof since different ones of the adjacent conductors are selected as the shielding wires to define the zone as the selection of the sensing conductor changes.

As shown in FIG. 3, the stored output of the measurement process can then be plotted in on a three dimensional graph. The leakage current level is represented as $I_f$ on the Z axis 26, the roof membrane detection cables are plotted on the X axis 24 and Y axis 25 respectively. A leakage current example is plotted on the X and Y axis as illustrated. The current maximums allow a vectoring to the membrane damage location indicated at 27.

When no measurements are being made, a low voltage supply 21 can be switched 22 into the circuit thereby connecting the positive terminal of the supply to the roof deck ground via the ground connector 14 with the negative terminal connected to circuit ground. This will impress a cathodic protection current on the sensing conductors at any current leakage points to counter act any galvanic corrosive mechanisms.

Figure 5:
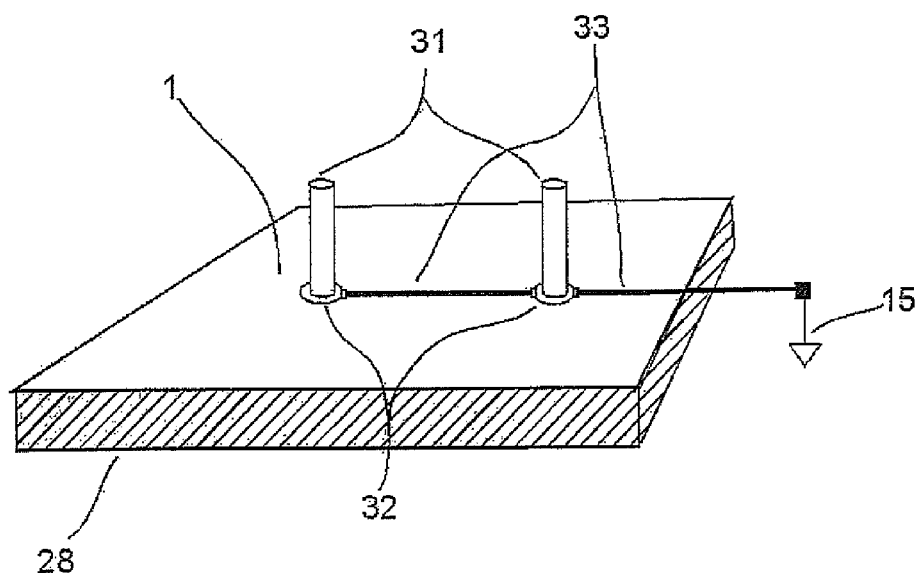
FIG. 5 is an isometric view of metallic roof penetrations with shield rings installed.

As shown in FIG. 5, shield rings 32 can be dressed around roof penetrations 31 and connected to the shield circuit ground via insulated connecting cables 33. This will further isolate conductive penetrations and reduce the risk of false readings.

While the potential applied between the conductive detectors and the roof deck when selected and between the conductive detectors and the roof deck when not selected is typically substantially the same, advantages may be obtained by increasing the potential difference across the conductors when they are acting as shielding conductors. This can draw in more of the current from remote locations which can interfere with proper measurement at the selected measurement conductor.

Figure 14:
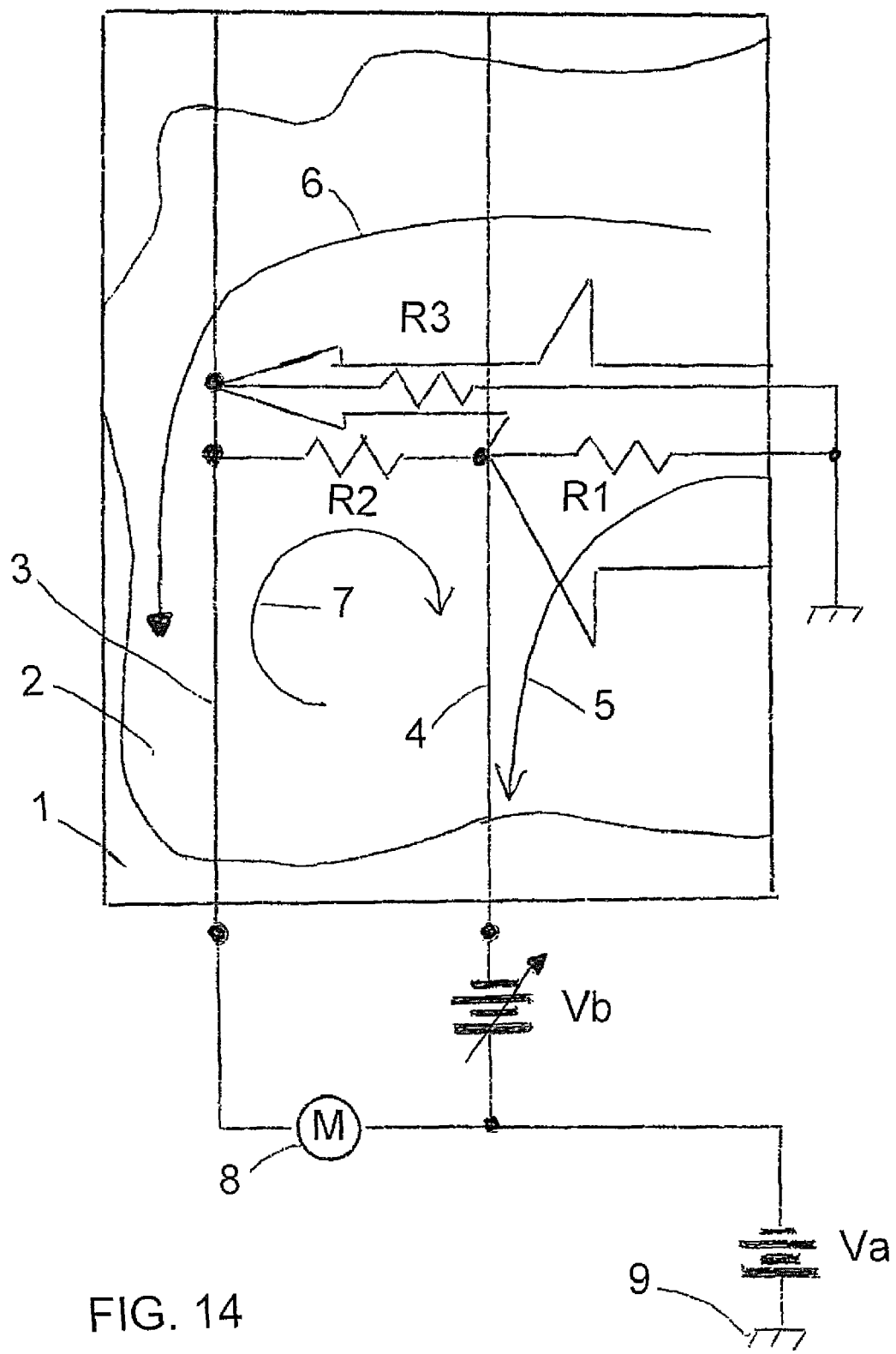
FIG. 14 is a schematic plan view similar to that of FIG. 1 of a roof membrane with one detection conductor and one shielding conductor and providing an arrangement for increasing the potential difference applied to the shielding conductor.

Referring to FIG. 14, the roof membrane 61 is illustrated with two parallel conductor grid lines 63, 64 with a first grid conductor 63 connected in series with a current measurement device 68 and a positive grounded 69 voltage source Va. A second grid conductor 64 is connected in series with a variable voltage source Vb and the fixed voltage source Va which is connected to ground 69. A thin layer of water 62 covers the membrane 61 and provides a conductive path over the surface of the membrane. Leakage current from ground sources reach the second grid conductor 4 along the water path represented by R1. The grid conductor 64 acting as a guard provides a direct return path for the loop current 5 to the voltage sources Vb and Va. A second leakage path represented by R3 illustrates the fraction of total leakage current which travels past the guard grid conductor 64 and reaches the measuring grid conductor 63. This current is typically a few percent of the total stray leakage current and the equivalent circuit resistance of R3 is proportionally larger than R1. The electrical resistance of the water path between grid conductor 63 and grid conductor 4 is represented by R2. With Vb set to 0 volts the stray current 66 through R3 travels through the current measuring device 68 and back to the voltage source Va. As Vb is increased from 0 volts, the guard grid conductor 64 is raised to a negative potential of Va+Vb volts with respect to ground. Additionally, a loop current 67 is set up through R2 which opposes the stray current loop 66 through R3.

When Vb/R2=Va/R3 the stray current through R3 is balanced by the opposing loop current 67 and the error current through the measuring device 68 is eliminated. As R3 is much greater than R2, the value of Vb for balance is only a fraction of Va: Vb=VaR2/R3. In practice Va is fixed at 24 v dc and Vb is on the order of a volt or less.

Should a membrane damage occur in the region between grid conductor 63 and grid conductor 64, the potential difference between the conductors is small (a volt or less) and the circuit will perform essentially the same as if Vb was set to 0 volts.

Figure 15:
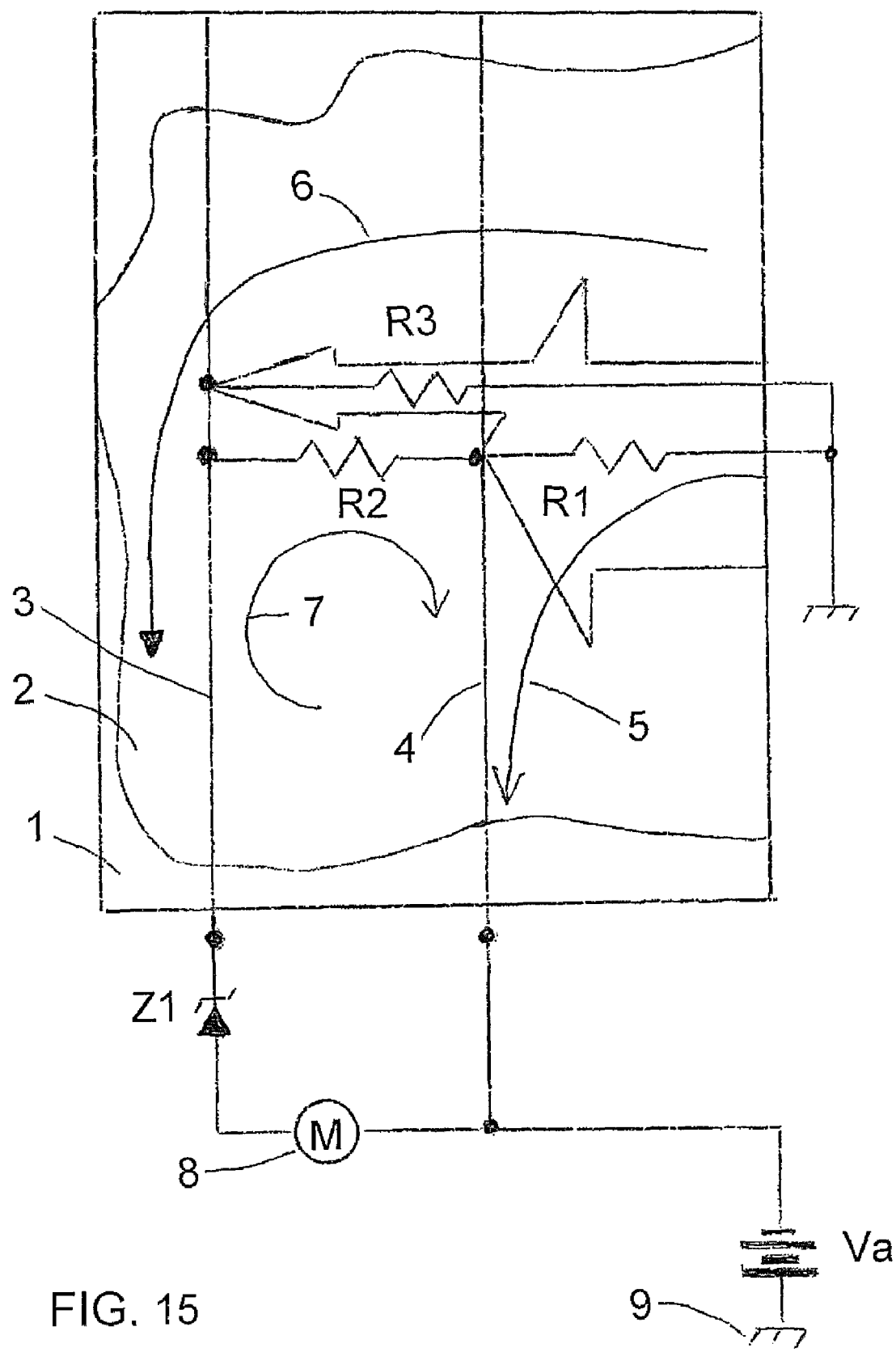
FIG. 15 is a schematic plan view similar to that of FIG. 6 showing an alternative arrangement for increasing the potential difference applied to the shielding conductor.

In a second embodiment as illustrated in FIG. 15, the voltage source Vb is replaced by a zener diode Z1 having a voltage drop of Vz volts which is placed in series with the measuring device 68. In this circuit, the stray current 6 through the measuring circuit reaches zero when Vz=VaR2/(R2+R3) which in practice is in the range of one volt.

The zener diode arrangement is preferred as it does not require a separate adjustable supply. For small zener voltages standard forward biased diodes van be used for fractional volt drop selection.

Figure 16:
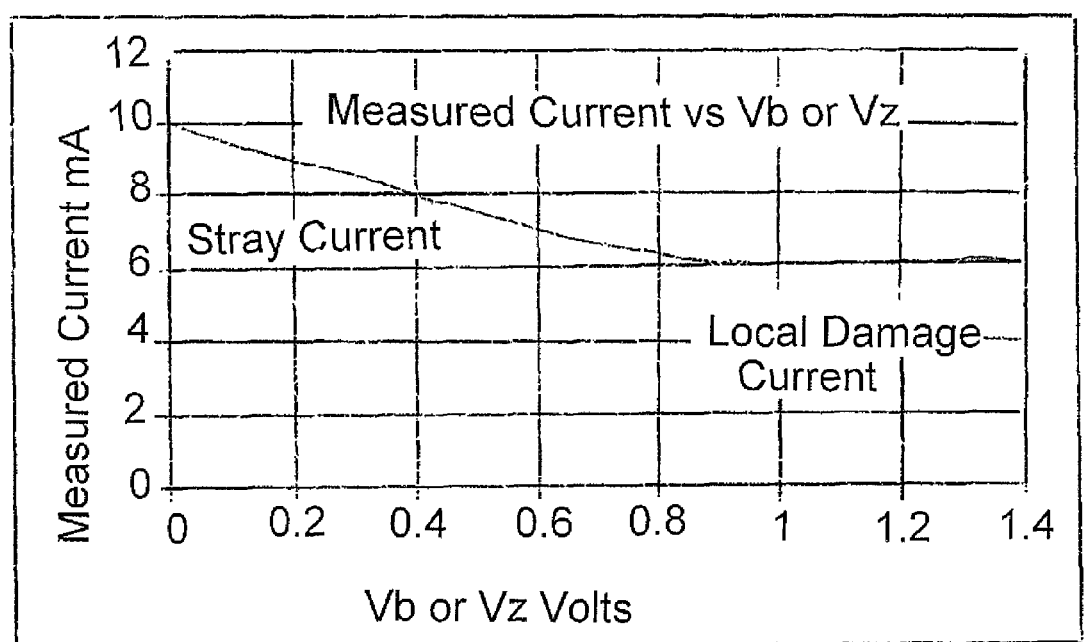
FIG. 16 is a graph of current measured relative to the difference in potential between the voltage on the conductive detector and the voltage on the shield conductor.

FIG. 16 is a graph of current measured relative to Vb or Vz volts, that is the difference in potential between the voltage on the conductive detector and the voltage on the shield conductor. In a practical application the stray current magnitude is not known but drops off rapidly as Vb or the zener voltage is raised. This action has little effect on any current leakage from any membrane damage in the area next to the measuring conductor as illustrated in FIG. 16. As illustrated, once the stray current is minimized, the remaining current is localized leakage resulting from membrane damage in the area adjacent to the measuring conductor.

The use of the other conductors than the selected measuring conductor to effect a shielding action is not essential and valuable scanning information can be obtained without using the shielding action. However the shielding action can be used to provide an improved accuracy of the measured current for more accurate assessments.

In most cases, when the y conductors are selected only the remaining y conductors are connected to the potential difference and are used for shielding while the x conductors are left to float. Symmetrically when the x conductors are selected, the remaining x conductors are used to shield. However an arrangement can be used in which all the remaining conductors are used as a shielding system.

It will be appreciated that the effect of selecting the others of the conductors as a shielding zone while sequentially testing at the selected conductors is that the zone (and the sensing conductor within the zone) is moved across the roof to different locations to effect measuring within those locations.

Figure 6:
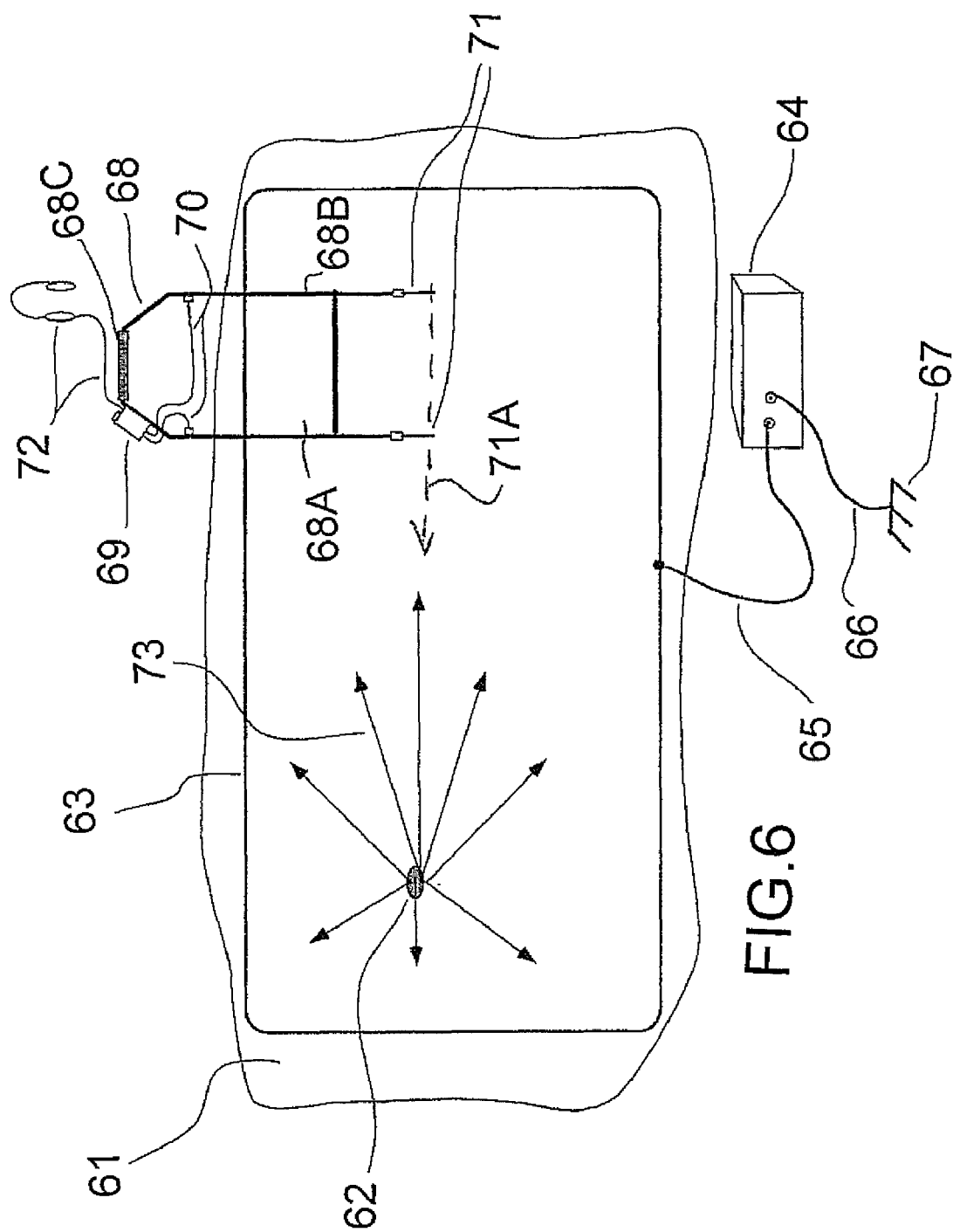
FIG. 6 is an isometric view of a frame mounted leak location system on a roof deck.
Figure 7:
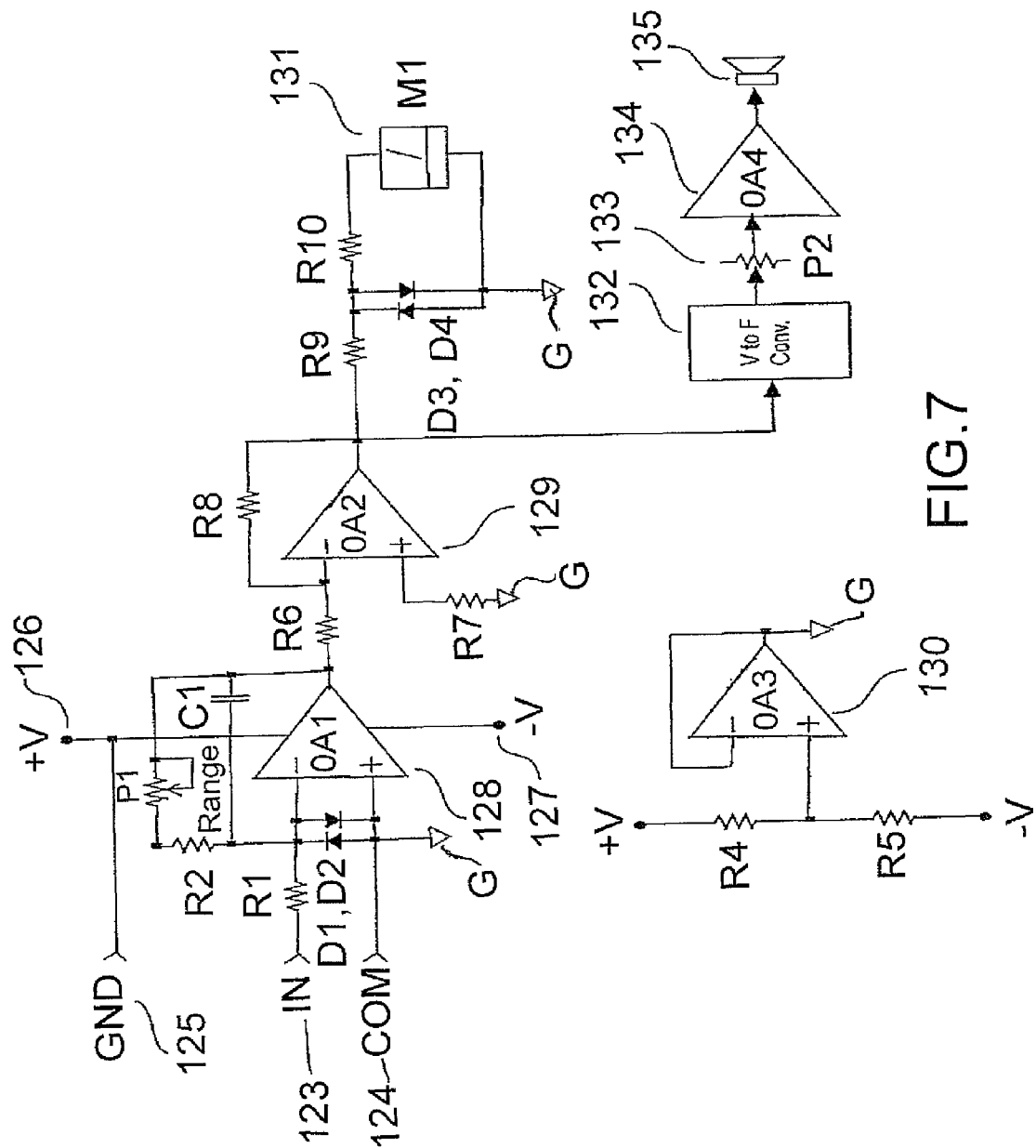
FIG. 7 is a circuit schematic of the receiver of FIG. 1 which includes an auto-zeroing receiver system and an audible alert.

Turning now to the embodiment shown in FIGS. 6 and 7, the operation of the horizontal roof membrane leak location system is shown in FIG. 6. A bare conductor 63 is placed in a closed loop on top of the roof membrane area to be tested. A DC power source 64 is connected between the roof deck and the energizing conductor 63 by a grounding cable 66 connected to a building ground point 67 on the roof deck and an energizing cable 65 connected to the loop conductor 63. The surface of the roof membrane is then sprayed with water so as to dampen the entire area 61 under test.

A probe mounting frame 68 with a receiver 69 attached to the frame is positioned within the area to be tested. Two insulated conducting probes 71 carried on the frame are connected to the input of the receiver or meter 69, mounted on the frame, by two insulated connecting cables 70. A headphone and connecting cable 72 is plugged into the audio output jack on the receiver 69. The frame is a fixed structure which provides two legs 68A and 68B at fixed separation and position to hold the probes at a fixed spacing. The legs are carried on a handle 68C which can be grasped by a single hand of the operator to simultaneously manipulate the position and orientation of the frame and the probes.

Thus the frame includes a pair of upstanding legs onto a lower end of each of which a respective one of the probes is mounted so as to project downwardly therefrom. The frame includes a center handle portion between the legs.

An electrical circuit is formed between the roof deck via the building ground 67 and the energizing cable 63 through any roof membrane defect 62 which provides a conductive path through the membrane. With the roof circuit energized, the mounting frame 68 is positioned on the roof membrane and the probes 71 brought into electrical connection with the roof membrane so that current flows to the two probes.

It will be appreciated that the amplitude of the current decreases along any line extending from the defect to the peripheral cable 63.

The voltage connected between the roof deck and the peripheral conductor is constant so as to generate a constant current flow rather than the use of pulses which generate a varying current due to the charging current rush at the beginning of every pulse. The difference between the currents detected by the two probes is at a maximum when a line 71A joining the probes 71 is aligned with the defect. The current is at a maximum when the probes are closest to the defect.

With the probes fixed on the frame 68, the frame is rotated by the operator until the maximum difference between the two currents is detected to provide a maximum pulse rate in the headphones 72 which corresponds to a maximum reading on the signal level meter 69. In this position, the operator knows that the line 71A joining the probes is aligned with the defect. The mounting frame is thereby brought into directional alignment with the current 73 from the defect so as to indicate the direction to the location of the defect 62. The mounting frame is then advanced in steps along that line 71A until a maximum signal level and audible pulse rate is achieved thus indicating the actual location of the defect.

The schematic diagram for the receiver unit is shown in FIG. 7 and is similar in operation and construction to the circuit previously described. The two mounting frame probes 71 are connected by the insulated cables 70 to the respective input terminals 123 and 124. One side 123 is connected to the negative summing input of a first stage op-amp 128 through a resistor R1. The other side 124 is tied to circuit common. Diodes 1D1 and 1D2 provide input protection. The gain of the first stage op-amp is set by resistor 1R2 and potentiometer 1P1 while capacitor 1C1 filters out any unwanted noise.

The output of the first stage op-amp 128 is tied to the input of a second stage op-amp 129 through a resistor 1R6. Resistors 1R6 and 1R8 set the gain of the second stage op-amp 129 to unity. The positive summing input of the second stage op-amp 129 is tied to common through a resistor 1R7.

A voltage-to-frequency converter 132 has an input which is connected to the output of the second stage op-amp 129. The output of the V to F converter 132 is applied to the input of an audio-amp 134 through a volume control 133. The audio output of amp 134 is connected to the headphones 62 or to a speaker 124.

The output of the second stage op-amp 129 is connected to voltage limiting diodes 1D3 and 1D4 through a resistor 1R9. A signal level meter 131 is connected in series with a scaling resistor 1R10 across the diodes 1D3 and 1D4.

In order to avoid the need for zero offset adjustment of the meter circuit 131 as the supply voltage V changes, there is provided a circuit component which provides self adjustment of the common ground G of the main circuit connected to the op-amps 128 and 129. Thus the positive summing input of a third op-amp 130 is tied to the half the supply voltage point between +V and −V through equal value dividing resistors 1R4 and 1R5. The negative summing input and output port of op-amp 30 forms the circuit common G. In this way there is automatic adjustment of the circuit ground so that the meter is always centered at zero voltage difference between the probes and the meter moves away from the center position when a current difference is detected.

The above technique of the frame mounted probes is typically used when the deck is covered with an overburden or garden and the membrane is covered.

Figure 8:
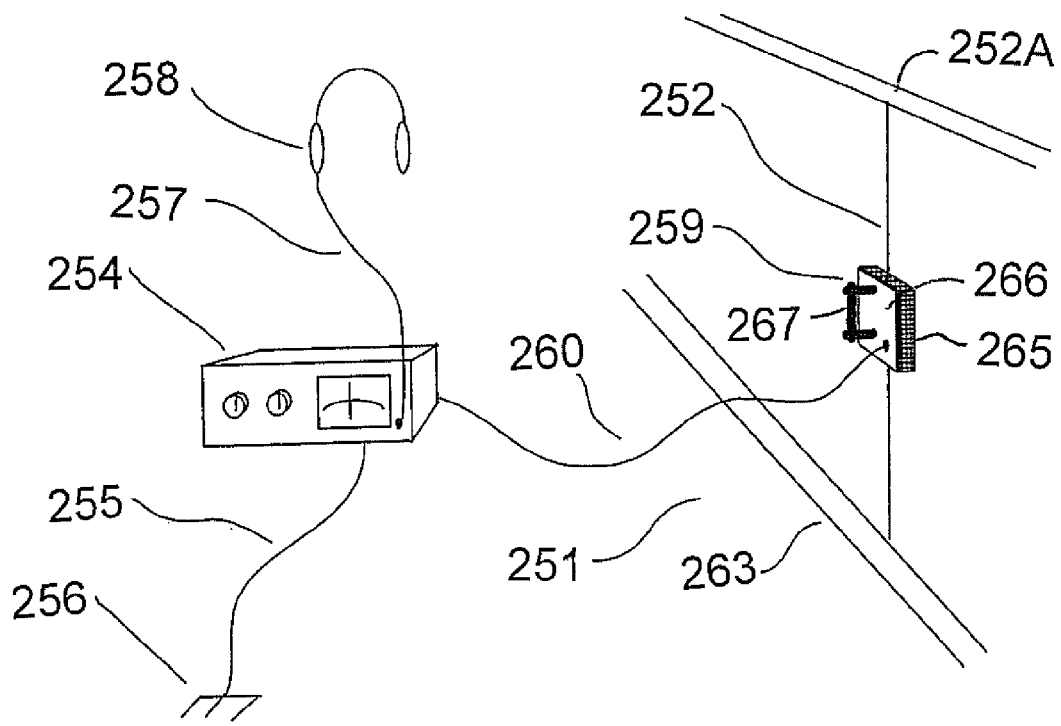
FIG. 8 is an isometric view of a leak detection probe on a vertical seam of a roof membrane.
Figure 9:
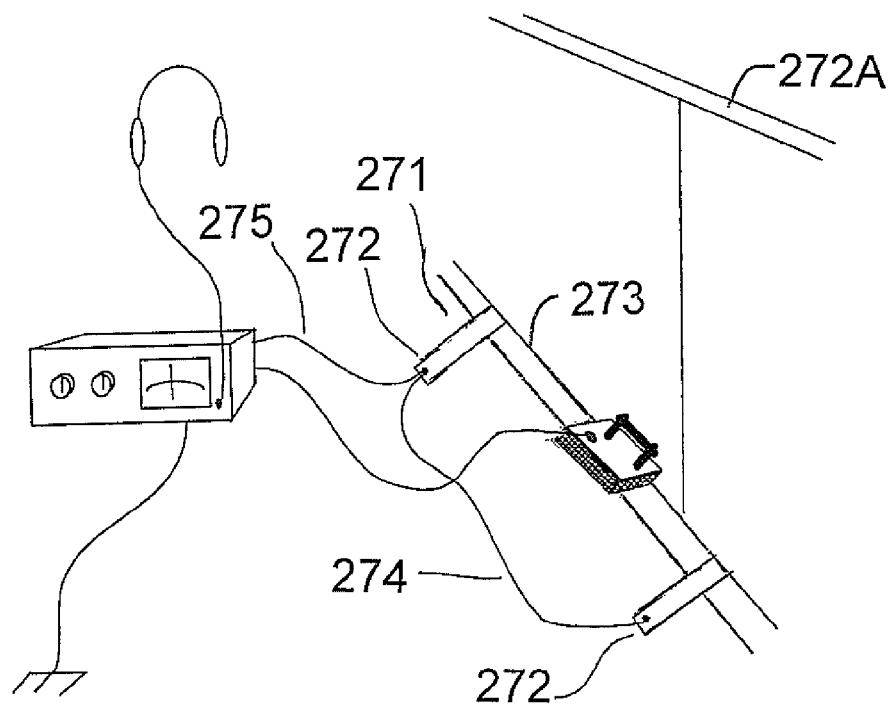
FIG. 9 is an isometric view of the leak detection probe on a horizontal seam with isolating conductors applied.

Turning now to the arrangement shown in FIGS. 8 and 9, the operation of the vertical roof membrane leak location system is shown in FIG. 8. The horizontal roof membrane 251 has a vertical membrane 252 at a roof parapet 252A. The receiver 254, which is of the construction and arrangement previously described, is operated to apply the positive side of the power supply to a building ground point 256 through a connecting cable 255. A connecting cable 257 and headphones 258 provide the audible output signal from the receiver 254.

In the example in FIG. 8, a sensor 259 in the form of a wet sponge is held against a seam on the vertical membrane. A connecting cable 260 ties the conductive wet sensor 259 to the input of the receiver 254. Moisture in the sensor 259 makes electrical contact with the membrane. Any breach in the vertical portion of the membrane will result in a conductive path forming through the breach to the parapet wall. A fault current will flow from the positively grounded building 56 through the breach to the wet sensor 259 and connecting cable 260 into the input of the receiver 254. The detection circuit of the receiver 254 as described above will generate an audible signal and meter deflection in response to the leakage current. The same probe can be wiped over a horizontal seam at an edge of the roof.

The schematic diagram for the receiver unit 254 is shown in FIG. 7. The building ground is connected to the positive supply via the ground jack 226. The sensor 259 is connected via a cable 210 to the negative summing input of the first stage op-amp 128 through the input jack 123 and current limiting resistor 1R1. Diodes 1D1 and 1D2 provide input protection. The gain of the first stage op-amp is set by resistor 1R2 and potentiometer 1P1 while capacitor 1C1 filters out any unwanted noise.

The output of the first stage op-amp 128 is tied to the input of the second stage op-amp 129 through a resistor 1R6. Resistors 1R6 and 1R8 set the gain of the second stage op-amp 0A2 to unity. The positive summing input of the second stage op-amp 129 is tied to common through a resistor 1R7.

The voltage-to-frequency converter 132 has an input which is connected to the output of the second stage op-amp 0A2. The output of the V to F converter 132 is applied to the input of the audio-amp 134 through a volume control 133. The audio output of amp 132 is connected to the headphones 158 or to a speaker 135.

The output of the second stage op-amp 129 is connected to voltage limiting diodes 1D3 and 1D4 through a resistor 1R9. A signal level meter 131 is connected in series with a scaling resistor 1R10 across the diodes 1D3 and 1D4.

In FIGS. 8 and 9, the sensor 259 comprises a sponge 265 mounted on a backing plate 266 carried on an insulating handle 267. Thus the contact from the cable 260 is connected to the conductive plate 266 for communication of current is through the moisture in the sponge. However the operator moving the sensor is isolated from the current by the insulated handle 267.

The handle can comprises a simple transverse bar at the rear of the probe or the handle can comprise an elongate pole extending from the rear of the probe allowing the operator to stand and wipe the probe over seams from a standing position.

The contact portion of the sensor 259 can comprise any flexible material which can wipe over an area to be sensed and provide contact between the material and the membrane over the whole area of the material while carrying moisture into contact with the membrane. Thus the material can be a sponge or can be a fabric such as felt or can be other materials which have the required characteristics of carrying the liquid into contact with the membrane and sufficient flexibility to deform slightly where required to remain in contact with the membrane over changes in surface height and over changes of angle.

As the peripheral conductor 63 of FIG. 6 as no effect in generating a potential difference in the area of the parapet 252A, this arrangement uses current communicating directly between the roof deck and the sponge sensor and acts to measure the absolute value of that current against a fixed comparison value provide at COM terminal 124 which is connected to the positive input of the amplifier 128.

Thus the sponge sensor acts to apply moisture to the membrane to create the conductive circuit and acts as a sensor to detect the value of the current so caused. It will be appreciated that the current will vary as the sensor is moved closer to a breach from a zero current where there is no breach to a maximum directly at the breach. The comparison with the fixed value thus locates this maximum which is communicated to the operator either using the meter 131 or the headphones 258.

In certain situations a conductive path will exist beyond the area under test due to extensive wetting of the membrane. In FIG. 9 a method to isolate the area under test is illustrated. A horizontal seam 273 next to the parapet wall 272A is shown with a water path 271 extending beyond the test area. A metallic strip 272 is placed across the water path 271 on one end of the area to be tested and a second metallic strip 272 placed across the other end of the area to be tested. The metallic strips are connected to the circuit common ground via cables 274 and 275. Any fault current flowing along the water path from membrane breaches outside of the test area is isolated by the metallic strips thereby isolating the test area.

Typically, the test described above is carried out on a membrane before any overburden such as gravel or pavers are placed on top. In this case all the seams, near the wall/roof deck interface and on the vertical portions of the parapet are tested using the technique.

After this test, the carriage arrangement described below is used to test the main area of the horizontal roof membrane.

Figure 10:
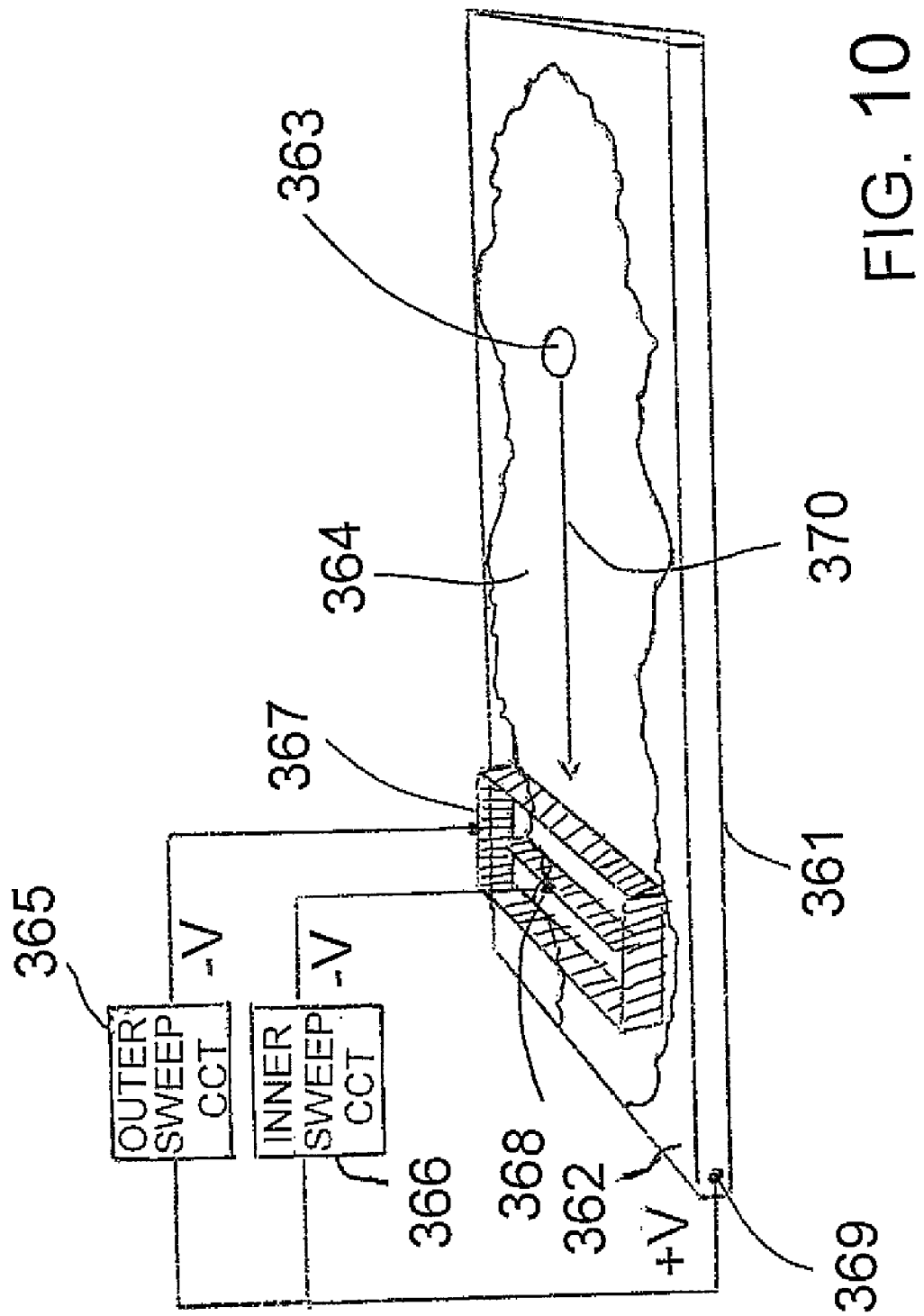
FIG. 10 is an isometric view of a roof membrane on a roof deck including a basic illustration of a carriage arrangement for use in carrying out a test on the main body of the membrane.

The overall arrangement of the carriage arrangement can best be seen with reference to FIG. 10. A roof membrane 362 is illustrated which is applied as a direct covering layer over a concrete roof deck 361. The deck is typically of concrete but can be of any suitable material to provide the necessary structural strength and can be steel or wood. The membrane is an impervious material such as plastics and is sealed at any joints to provide a continuous water barrier over the roof deck. This barrier is intended to provide the leak prevention and any penetration therein caused by a puncture or faulty seal or by wear can allow the moisture to penetrate to the deck where it can cause damage or can continue into the structure to cause damage to internal structures.

A defect in the membrane 63 allows water 364 to intrude and forms a conductive path to the roof deck. The conductive outer 367 brushes and inner 368 brush are placed on the top surface of the membrane 362 with the outer perimeter conductive brushes 367 surrounding the inner brush 368. The brush sets are positioned so as to be in intimate contact with the wetted surface 364 of the test area. The outer sweep detection circuit 365 and inner sweep detection circuit 366 which share a common power supply are connected to the outer brush set 367 and inner brush set 368 respectively with the common positive side of both connected to a grounding point 369 on the deck.

A DC potential is applied between the roof deck 361 and the wetted area 364. At the membrane damage site 364 there is a conductive path through the membrane and a leakage current 370 travels through the damage point and back to the outer conductive brush 367. The return current picked up by the outer brushes is measured and displayed on the outer sweep circuit 365. As the outer brush perimeter surrounds the inner brush sensor, very little of the return current reaches the inner brush 368. The sweep system is then moved forward over the membrane towards the defect and when the outer brush passes over the damage site, the inner brush picks up the return current and provides a visual and audible alarm. The damage site is thereby located. The detector circuit is substantially as shown and described above.

Figure 13:
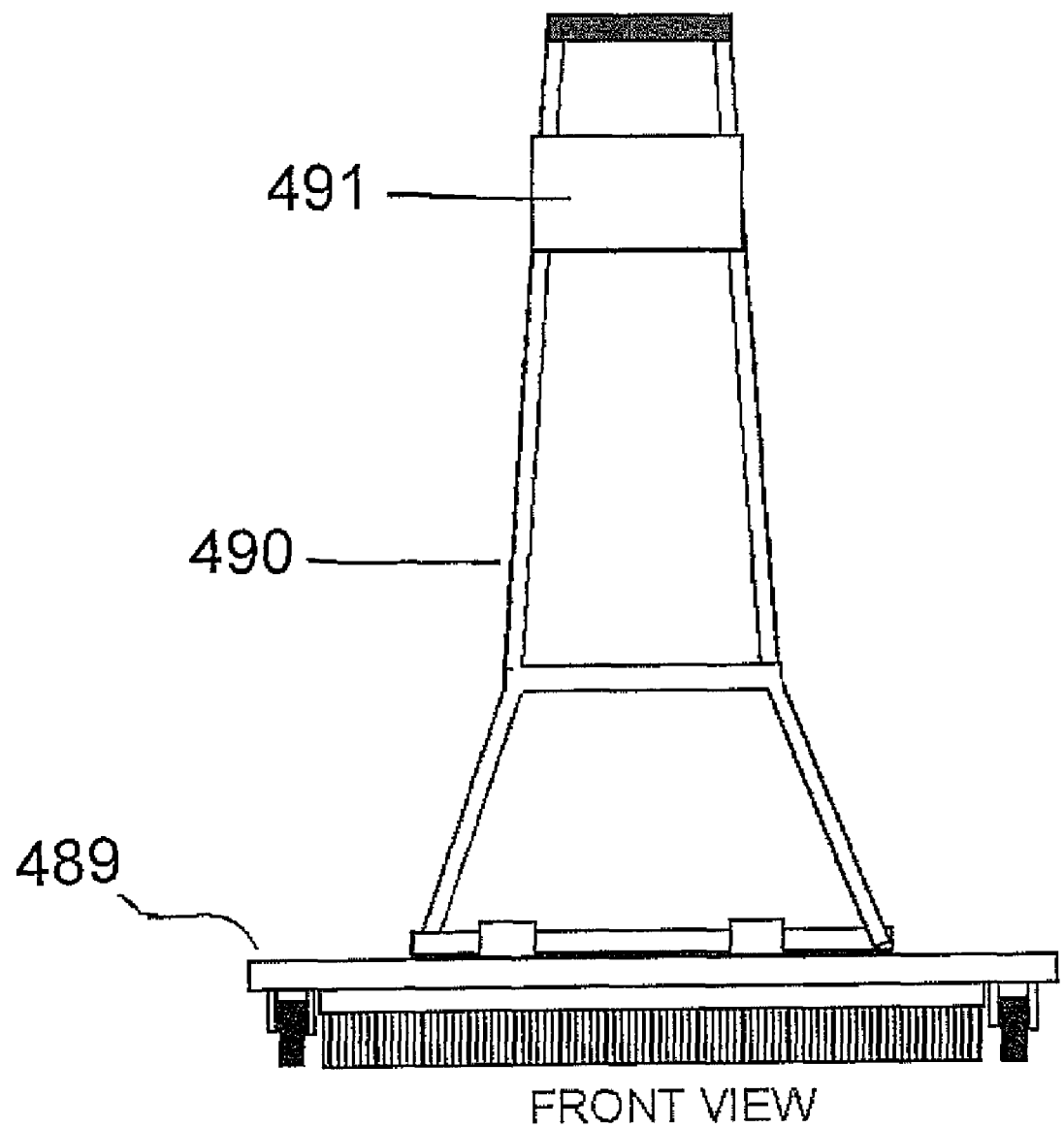

The mechanical arrangement of the apparatus is illustrated in FIGS. 11, 12 and 13. A horizontal platform or carriage 480 with a flat top wall and a depending side wall 485 forming four sides of a rectangular carriage. The carriage is carried on four swivel wheels or casters 481 attached to the top plate by mountings 486. The carriage supports an outer brush assemblies defined by two parallel front and rear brushes 482 and two parallel side brushes 487, thus defining a rectangular outer area just inside the outside wall of the carriage. Inside the outer rectangular area is provided a single transverse brush defining an inner brush 483. Vertically floating brackets 484 position the outer brushes and allow vertical movement of the brushes as the platform travels over the membrane surface. Similar brackets 488 carry the inner brush. The brushes are formed as a strip from conductive bristles carried on a base so that the base can float upwardly and downwardly from pressure of the roof against the tips of the bristles so that a constant electrical contact is maintained with the roof.

A simple manually graspable handle assembly 490 is attached to brackets 489 on the top plate of the carriage. The sweep circuits are mounted in a housing 491 and attached to the handle 490 assembly at a position below a top hand rail of the handle assembly.

In place of the brushes which may have problems when changing direction, hanging chain links can be used which drape over the surface and provide an effective and constant contact as the carriage is scanned over the surface.

The scanning of the main body of the roof can thus be carried out using the probes of FIG. 6 or more preferably the carriage of FIGS. 11 to 13 following which the areas at the parapets and other difficult to reach locations can be checked using the probe system of FIGS. 8 and 9.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. A method of locating a defect in a water impermeable membrane of a roof, where the roof comprises a generally horizontal roof support deck with the water impermeable membrane applied onto an upper surface of the support deck, the method comprising:

locating a conductive detector on an upper surface of the roof membrane;

defining a shielding zone on the upper surface of the membrane by providing at least one shielding conductor on the upper surface and by generating an electrical potential difference between said at least one shielding conductor and the roof deck such that currents generated outside the zone are drawn to said at least one shielding conductor;

generating an electrical potential difference between the conductive detector and the roof deck such that, in the presence of a defect located within the zone, current flows between the roof deck and the conductive detector through moisture at the defect;

sensing the current between the roof deck and the conductive detector so as to detect any defect located within the zone;

and arranging the electrical potential difference between said at least one shielding conductor and the roof deck so as to be greater than the electrical potential difference between the conductive detector and the roof deck.

2. The method according to claim 1 including applying bare wires to the upper surface of the membrane to operate as said at least one shielding conductor and said conductive detector.

3. The method according to claim 1 including covering said membrane with said at least one shielding conductor and said conductive detector thereon by an aggregate.

4. The method according to claim 1 including covering said at least one shielding conductor and said conductive detector with insulating sleeves to allow another one of the conductive detectors to pass over the sleeve at right angles thereto.

5. The method according to claim 1 including arranging a plurality of conductive detectors on the upper surface of the roof membrane in a grid pattern providing indications of distance in x and y direction across the membrane with each conductive detector being electrically insulated from each other; selecting each one of the conductive elements in turn and analyzing the sensed currents in the x and y directions to locate the defect in the membrane.

6. The method according to claim 5 including, when each one of the conductive elements is selected in turn, connecting at least some of the other conductive elements so as to form shielding conductors.

7. The method according to claim 1 including causing said at least one shielding conductor to receive current generated by un-insulated roof fixtures.

8. The method according to claim 1 including providing as said at least one shielding conductor a plurality of shielding conductors arranged at spaced positions relative to the conductive detector.

9. The method according to claim 1 wherein the electrical potential difference between said at least one shielding conductor and the roof deck and the electrical potential difference between the conductive detector and the roof deck are generated by a common voltage source and the difference therebetween is generated by an additional voltage source connected to said at least one shielding conductor.

10. The method according to claim 1 wherein the electrical potential difference between said at least one shielding conductor and the roof deck and the electrical potential difference between the conductive detector and the roof deck are generated by a common voltage source and the difference therebetween is generated by providing an electronic component which generates a voltage drop connected to said at least one shielding conductor.

11. The method according to claim 1 wherein the electrical potential difference between said at least one shielding conductor and the roof deck and the electrical potential difference between the conductive detector and the roof deck are generated by a common voltage source and the difference therebetween is generated by providing a zener diode which generates a voltage drop connected to said at least one shielding conductor.

* * * * *